Jan. 12, 1926.

B. G. TULLGREN

CHUCK

Filed June 19, 1923

Inventor

Bernard G. Tullgren

Jan. 12, 1926. 1,569,591
B. G. TULLGREN
CHUCK
Filed June 19, 1923 2 Sheets-Sheet 2

Inventor
Bernard G. Tullgren

Patented Jan. 12, 1926.

1,569,591

UNITED STATES PATENT OFFICE.

BERNARD G. TULLGREN, OF BROOKLYN, NEW YORK.

CHUCK.

Application filed June 19, 1923. Serial No. 646,424.

*To all whom it may concern:*

Be it known that I, BERNARD G. TULLGREN, a citizen of the United States, residing at Brooklyn, in the county of Kings and State of New York, have invented certain new and useful Improvements in a Chuck, of which the following is a specification.

This invention relates to improvements in chucks and has for its prime object to provide a chuck particularly adapted for use in the production of very accurate work, that is not otherwise attainable with chucks now universally used.

A further object of the invention is to provide a chuck of the character indicated which after being correctly bored out can be used an indefinite number of times in one set up, which feature of the invention is particularly desirable when used for light, frail work.

A still further object of the invention is to provide a chuck of the character indicated, which can be used to hold work both internally and externally.

And a still further object of the invention is to provide a chuck of the character indicated, which is simple in construction, durable, efficient for the purpose intended, and one that can be manufactured and placed on sale at a relatively low cost.

These and like objects of the invention will be better understood as the description follows and as is specifically pointed out in the appended claims.

Referring to the accompanying drawings which form a part of this specification and which clearly show the construction and operation of my improved chuck, Figure 1 is a plan view of a chuck constructed in accordance with my invention.

Referring to the accompanying drawings in detail, like characters will be used to designate like parts in the different views.

Figure 1:
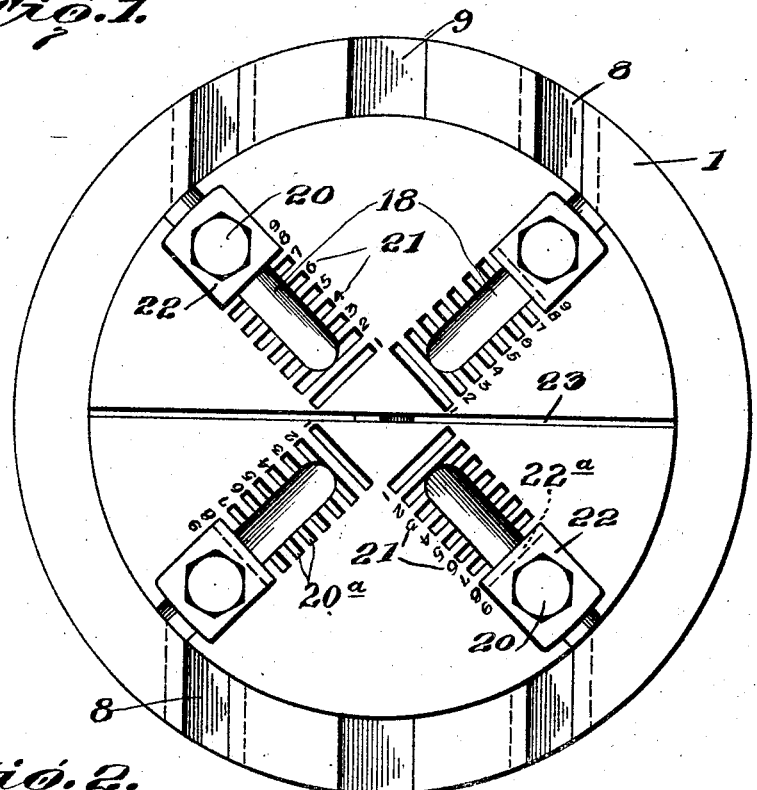
Figure 2:
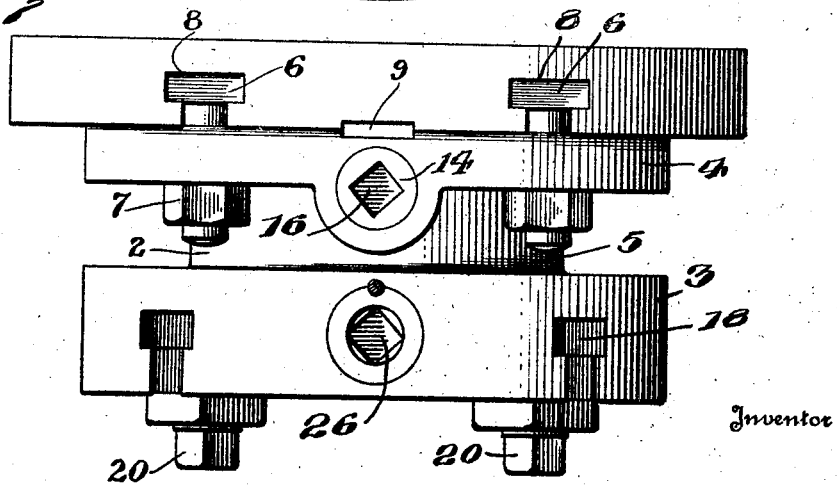
Figure 2 is a side elevation of same.

In the drawings, the numeral 1 indicates a base plate which is adapted for engagement with a lathe face plate, (not shown).

A chuck body 2 which comprises an outer flange 3 and an inner flange 4 is joined together by a reduced portion 5. The chuck body 2 as a whole is held into engagement with the outer face of the base plate 1, by means of T bolts 6, that extend through the flange 4 of the chuck body and are locked in position by means of lock nuts 7. The T heads of the bolts, which are four in number, are adapted to enter grooves 8 in the face of the base plate 1.

Figure 3:
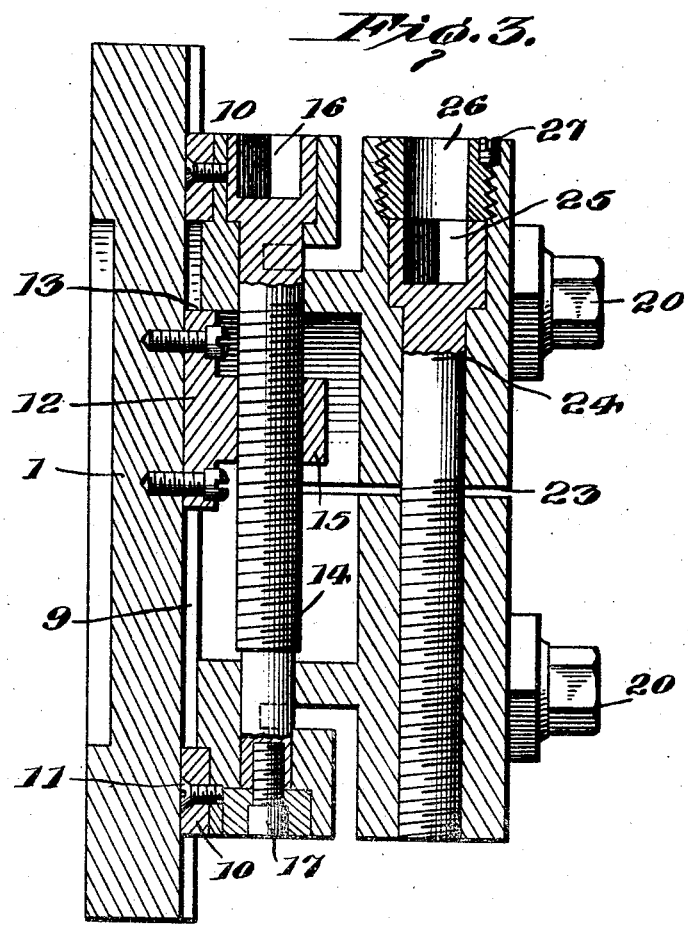
Figure 3 is a vertical section through the chuck.
Figure 4:
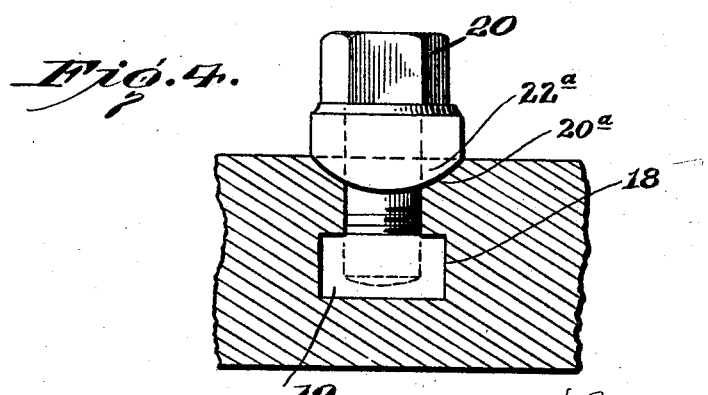
Figure 4 is an enlarged fragmentary section through one portion of the chuck.

The face of the base plate 1 is provided with a vertical groove centrally of same that extends throughout its entire length, as indicated by the numeral 9. Guide blocks are secured to the inner face of the inner chuck flange 4 by means of fastening screws 11. The guide blocks are two in number and are adapted to be positioned within the vertical groove 9 of the base plate 1. A screw block 12 is attached to the outer face of the base plate 1 and is positioned in the vertical groove 9. The screw block 12 is so positioned against the face of the base plate, that when the chuck body is pressed in engagement with same as at 13, the chuck body is concentric with the base plate 1, as is clearly seen in Figure 3 of the accompanying drawings.

A screw bolt 14 is positioned vertically in the chuck body 2 and extends through the inner flange 4 and through a projection 15 formed on the screw block 12. By inserting a wrench in the socket end 16 of the screw bolt 14, the screw bolt is made to work through the extension 15 of the screw block 12, thus raising the chuck body as a whole to move same eccentric of the base plate 1. The screw bolt 14 is prevented from working out of engagement with the chuck body 2 by means of a washer and locking screw 17.

The outer flange 3 of the chuck body is provided with T shaped slots 18 in which are positioned nuts 19 mounted on the ends of jaw bolts 20, of which there are four in number and placed at spaced intervals around the periphery of the flange 3. The front of the chuck body 1 is provided with a series of grooves 20$^a$ extending across said T-shaped slots 18, said grooves having scale markings 21. A jaw washer 22 having a projection 22$^a$ thereon is positioned beneath the head of each of the jaw bolts 20 with the projections carried thereby received in one of the grooves 20$^a$, so that a piece of work adapted to be held in position for a drill is inserted between the jaw washers 22 and after the work has been brought to the desired position, which can be determined by the scale markings 21, the jaw bolts 20 are screwed into position and firmly clamped for fastening the jaw washers at the desired measurement.

The chuck body 1 is provided with a horizontal slot 23 that extends the full width of the chuck body and approximately two-thirds the thickness of same. A compression bolt 24 is adapted to be inserted in aligned bores in both parts of the chuck body or flange 3 which is divided by the horizontal slot 23, so that by inserting the proper tool in a socket 25 of the compression bolt 24, the width of the slot 23 can be widened or decreased, so as to firmly clamp the work between the jaw washers in position.

The compression screw is prevented from working out of engagement with the chuck body by means of a screw threaded sleeve 26, which is locked in position by means of a set screw 27, or any other suitable fastening means.

In view of the foregoing description of my invention taken in connection with the accompanying drawings, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. A device of the character described comprising a base plate having a groove formed in one side thereof, a chuck arranged on the side of said base plate having said groove, guide blocks carried by said chuck and received in said groove, a screw block arranged in said groove and attached to said base plate, means carried by said chuck and operable through said screw block for adjusting the chuck to an eccentric position with relation to said base plate, said screw block arranged for engaging said chuck to stop the adjustment thereof past a concentric position with relation to said base plate.

2. A device of the character described comprising a base plate, a chuck adjustable on said base plate, said chuck having a slot extending the full width of same, said chuck also having slots in the outer face thereof which are T-shape in cross section, the outer face of said chuck also having grooves formed at right angles to said slots, said grooves being formed in series and along said slots, gripping jaws, projections on said gripping jaws each adapted to be received in a groove of each series, bolts arranged for engaging in said T-shaped slots for holding said gripping jaws in adjusted position, and means attached to each section of said chuck separated by said first mentioned slot for drawing said sections together to clamp work between said jaws.

In testimony whereof, I have affixed my signature.

BERNARD G. TULLGREN